July 24, 1956  K. V. KEELEY  2,755,793
SPACE HEATER FOR USE ON OPEN GAS BURNER
Filed Dec. 28, 1953

KEDRIC V. KEELEY,
INVENTOR.

BY

ATTORNEY

United States Patent Office 2,755,793
Patented July 24, 1956

2,755,793

SPACE HEATER FOR USE ON OPEN GAS BURNER

Kedric V. Keeley, Los Angeles, Calif.

Application December 28, 1953, Serial No. 400,715

4 Claims. (Cl. 126—248)

This invention relates to space heaters and has for one of its objects the provision of a novel space heater which may be placed upon an open burner of a cooking range so as to absorb the heat from said burner and radiate the same into the surrounding atmosphere.

It is a common practice to depend upon the kitchen range as a space heater. If the open burners are thus used, it results in inefficient space heating. If the oven is so used, it results in the stove deteriorating at an excessive rate.

It is an object of this invention to provide a simple and inexpensive space heater which derives its heat from an open burner of a kitchen range and has such a capacity for transmitting heat from said burner to the surrounding atmosphere as to render the use of this preferable to depending upon an oven burner for space heating, thereby tending to diminish the use of said oven burners and prolong the life of kitchen ranges.

Another object of the invention is to provide a space heater adapted to derive its heat from an open burner of a kitchen range over which the heater is placed and which will have a relatively high efficiency in absorbing the heat produced by said burner and radiating this heat laterally into the surrounding atmosphere.

Yet another object of the invention is to provide such a space heater which is extremely simple in construction and capable of economical manufacture.

The manner of accomplishing the foregoing objects as well as further objects and advantages will be made manifest in the following description taken in connection with the accompanying drawings in which.

Figure 1:
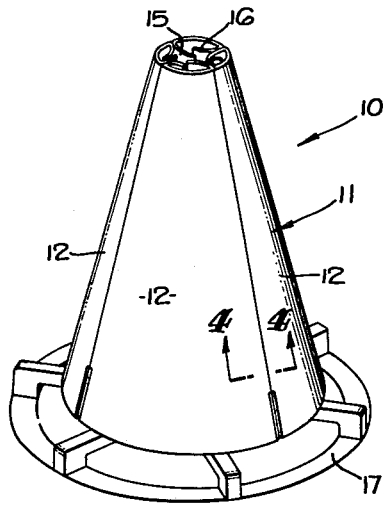
Fig. 1 is a perspective view of a preferred embodiment of the present invention resting on an open burner of a kitchen range as when in use.

Referring specifically to the drawings, the preferred embodiment of the invention illustrated therein comprises a space heater 10 which is in the general form of a cone truncated near its upper end. The heater 10 includes a conical shell 11 which is made up of a plurality of segmental elements 12 each of which has flanges 13 and 14 bent inwardly therefrom along opposite converging side edges, said flanges having their inner edges slit to form a vertical series of heat absorption fins 15 and 16 respectively.

Figure 3:
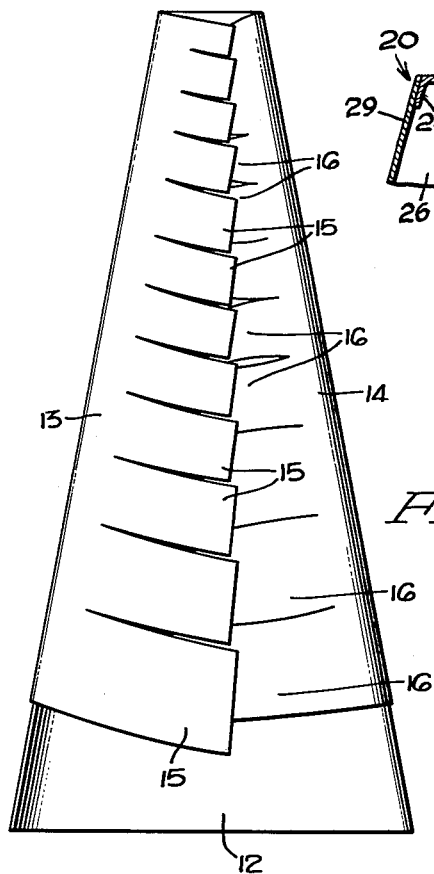
Fig. 3 is an elevational view of one of the segmental elements employed in the manufacture of the heater shown in Fig. 1.

The lower ends of the flanges 13 and 14 terminate a substantial distance above the lower end of the element 12 as clearly shown in Fig. 3. This results in the lowermost heat absorption fins 15 and 16 being held upwardly out of the hottest portion of the flame of a burner 17 (Fig. 1) when the heater 10 is placed over said burner. This prevents the lower fins 15 and 16 from becoming overheated.

Figure 4:
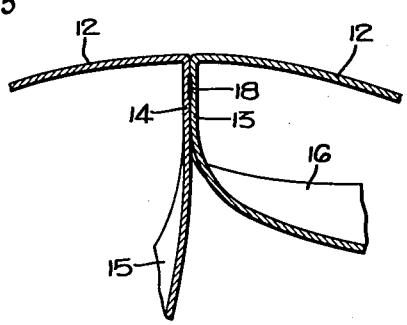
Fig. 4 is an enlarged sectional view taken on the line 4—4 of Fig. 1 and illustrates the manner in which the segmental elements of the invention are permanently assembled in the manufacture of said heater.

Base portions of the flanges 13 and 14, which are those portions located close to the elements 12, are bent inwardly from the said elements so that when four of these elements are assembled to form a heater 10, the base portions of said flanges abut together in pairs as shown in Fig. 4 and the manufacture of the heater 10 is accomplished by so assembling four elements 12 and uniting said abutting flanges as by spot-welding 18 as shown in Fig. 4 or otherwise fastened together as by bolts or rivets.

Each abutting pair of flanges is preferably thus secured together at two points, one of which is adjacent each of its upper and lower ends.

The fins 15 and 16 are preferably individually twisted on their longitudinal axes so as to cause hot combustion gases rising from the burner 17 to flow about and come into intimate contact with said fins thereby transmitting a large portion of the heat in said gases to said fins.

One of the advantages of the present invention which contributes substantially to the high efficiency thereof is the provision and formation of the heat absorption fins 15 and 16 so that these are integral with the respective segmental elements 12 which form the conical outer shell 11 of the heater 10. This integrated structure of the fins and shell result in a relatively efficient transmission to the outer shell of the heat absorbed by the fins 15 and 16. The outer shell 11 thus becomes heated rapidly following the placing of the heater over a lighted open burner as shown in Fig. 1 and when so heated the shell 11 radiates heat at a high rate into the surrounding atmosphere.

The heater 10 may be made of any suitable sheet metal such as wrought iron, brass or aluminum.

Figure 2:
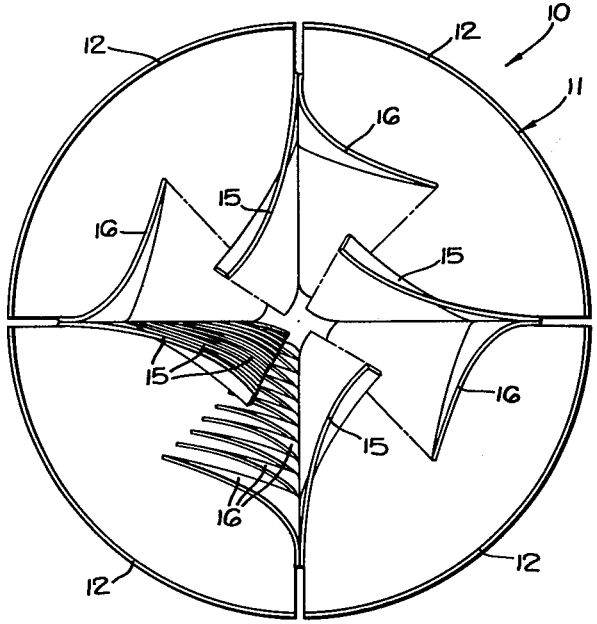
Fig. 2 is the bottom plan view of the heater shown in Fig. 1.

As clearly shown in Figs. 2 and 3, the fins 15 overlap the fins 16 (viewed from the center of the heater) and the fins 15 and 16 thus occupy substantially different areas within the shell 11 and are spaced apart substantially equal distances from each other and from the inner surface of the shell 11 so as to be uniformly subjected to the hot gases of combustion passing upwardly through the shell 11 from the burner 17.

The conical shape in which the heater 10 is constructed has the effect of subjecting the entire shell substantially uniformly to the heat of the burner 17 whereby oxidation of the material of which the heater is made takes place substantially uniformly throughout its entire structure. Furthermore, a substantially uniform temperature is maintained throughout the heater thereby causing it to be uniformly effective in radiating heat outwardly into the surrounding atmosphere.

Although preferably formed as a truncated cone, the shell 11 is essentially a vertical tube open at both ends and may be given various tubular shapes and still retain important features of the invention.

The performance of the heater 10 is enhanced by coating the outer surface thereof with a paint having a flat black texture when dry. Silicone paint having this characteristic has been found to give the heater 10 a high coefficient of radiation. This paint also is remarkably resistant to deterioration when the heater 10 is used at normal operating temperature at around 700° Fahrenheit.

While only a single preferred embodiment of the invention is disclosed herein, it is to be understood that various modifications and changes may be made in this without departing from the spirit of the invention or the scope of the appended claims.

Figure 5:
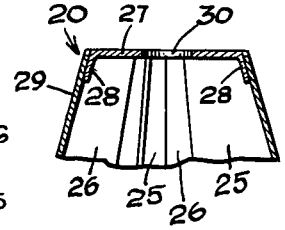
Fig. 5 is a fragmentary diagrammatic vertical sectional view of a modified form of the invention.

For instance in Fig. 5 a modified heater 20 is shown which, with the exceptions noted, is identical with the heater 10. Heater 20 has heating flanges 25 and 26 which, with the exception that they are not slitted like flanges 13 and 14, are identical with the latter.

The heater 20 also has a cover plate 27 which overlies the upper end of the heater, this plate being held in place by tabs 28 which extend into the upper opening of the heater 20 and are bent outwardly against the conical shell 29 thereof.

A central hole 30 is provided in the cover plate 27, the diameter of which is selected to allow passage of combustion gases at a rate designed to give the maximum efficiency in the absorption of heat from combustion gases rising into heater 20 and the radiation of this heat into the surrounding atmosphere.

The claims are:

1. In a space heater adapted to receive its heat from an open burner of a cooking range, the combination of: a vertical tubular shell open at its upper and lower ends to allow passage of air upward therethrough, said shell comprising a series of like segments arranged in symmetric relation about the axis of said shell; flanges radially inbent from opposite edges of each of said segments, said flanges at adjacent edges of said segments abutting in radial planes; means for uniting said flanges to assemble said segments to form said shell; and a series of heat absorbing fins formed on and integral with each of said flanges and extending inwardly into said shell from said flanges, the fins of each flange being bent to diverge at a substantial angle from the fins of the flange united therewith.

2. A combination as in claim 1 in which the heat absorbing fins of one flange of each united pair of flanges terminate along a line substantially midway between the extremities of the two series of fins provided on an adjacent pair of flanges, and in which the individual fins are twisted about their respective longitudinal axes to give an ex-foliated relationship between said fins with the latter turned to intercept currents of air rising through said shell.

3. A combination as in claim 1 in which said flanges are united by spot welding.

4. A combination as in claim 1 in which said shell has a frusto-conical shape with a relatively small opening at the upper end and in which said plurality of series of fins thus converge toward each other as they approach the upper end of said shell thereby coming continually closer together and being brought into more intimate contact with the air as the latter rises through said shell.

References Cited in the file of this patent

UNITED STATES PATENTS

| | | |
|---|---|---|
| 175,704 | Hawkesworth et al. | Apr. 4, 1876 |
| 451,944 | Marak | May 12, 1891 |
| 515,250 | Reynolds | Feb. 20, 1894 |
| 567,575 | Beal | Sept. 15, 1896 |
| 949,042 | Palmer | Feb. 15, 1910 |
| 1,261,160 | Pierce | Apr. 2, 1918 |